United States Patent
Miyazawa et al.

(10) Patent No.: US 10,844,162 B2
(45) Date of Patent: Nov. 24, 2020

(54) RESIN COMPOSITION AND MOLDED RESIN OBJECT

(71) Applicant: ZEON CORPORATION, Tokyo (JP)

(72) Inventors: Shinsuke Miyazawa, Tokyo (JP); Ayako Kato, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 55 days.

(21) Appl. No.: 16/318,197

(22) PCT Filed: Jul. 20, 2017

(86) PCT No.: PCT/JP2017/026268
§ 371 (c)(1),
(2) Date: Jan. 16, 2019

(87) PCT Pub. No.: WO2018/030105
PCT Pub. Date: Feb. 15, 2018

(65) Prior Publication Data
US 2019/0284333 A1 Sep. 19, 2019

(30) Foreign Application Priority Data
Aug. 8, 2016 (JP) ................................. 2016-155278

(51) Int. Cl.
*C08G 61/02* (2006.01)
*C08K 5/00* (2006.01)
*C08K 5/521* (2006.01)
*C08L 65/00* (2006.01)
*C08K 3/00* (2018.01)

(52) U.S. Cl.
CPC ............... *C08G 61/02* (2013.01); *C08K 3/00* (2013.01); *C08K 5/00* (2013.01); *C08K 5/0083* (2013.01); *C08K 5/521* (2013.01); *C08L 65/00* (2013.01); *C08G 2261/3325* (2013.01); *C08G 2261/724* (2013.01)

(58) Field of Classification Search
CPC .............. C08G 61/02; C08G 2261/724; C08G 2261/3325; C08K 5/0083; C08K 5/521; C08L 65/00

USPC ......................................................... 524/115
See application file for complete search history.

(56) References Cited

U.S. PATENT DOCUMENTS 5,194,534 A 3/1993 Bell
2010/0092712 A1* 4/2010 Ogawa .................. C08G 61/08
428/36.92

FOREIGN PATENT DOCUMENTS

| JP | H05345817 A | 12/1993 | |
| JP | 2009179650 A | 8/2009 | |
| JP | 4973815 B2 * | 7/2012 | ........... C08K 5/0083 |
| JP | 4973815 B2 | 7/2012 | |
| JP | 2015-054885 * | 3/2015 | |
| JP | 2015054885 A | 3/2015 | |
| WO | 2012033076 A1 | 3/2012 | |

OTHER PUBLICATIONS

Feb. 19, 2020, the Extended European Search Report issued by the European Patent Office in the corresponding European Patent Application No. 17839178.5.
Oct. 3, 2017, International Search Report issued in the International Patent Application No. PCT/JP2017/026268.

* cited by examiner

*Primary Examiner* — Hui H Chin
(74) *Attorney, Agent, or Firm* — Kenja IP Law PC

(57) ABSTRACT

Provided is a resin composition containing a hydrogenated crystalline dicyclopentadiene ring-opening polymer and a nucleator, wherein a content of the nucleator is 0.01 to 0.50 part by weight based on 100 parts by weight of the hydrogenated crystalline dicyclopentadiene ring-opening polymer, and a resin formed article comprising a hydrogenated crystalline dicyclopentadiene ring-opening polymer and a nucleator, wherein a content of the nucleator is 0.01 to 0.50 part by weight based on 100 parts by weight of the hydrogenated crystalline dicyclopentadiene ring-opening polymer. The resin composition containing a hydrogenated crystalline dicyclopentadiene ring-opening polymer is suitably used as a raw material for a low-polluting resin formed article, and a low-polluting resin formed article containing the hydrogenated crystalline dicyclopentadiene ring-opening polymer.

3 Claims, No Drawings

RESIN COMPOSITION AND MOLDED RESIN OBJECT

TECHNICAL FIELD

The present invention relates to a resin composition containing a hydrogenated crystalline dicyclopentadiene ring-opening polymer, which is suitably used as a raw material for a low-polluting resin formed article, and relates to a low-polluting resin formed article containing the hydrogenated crystalline dicyclopentadiene ring-opening polymer.

BACKGROUND ART

Since the hydrogenated crystalline dicyclopentadiene ring-opening polymer is excellent in chemical resistance, water vapor barrier property, heat resistance, transparency and the like, it is widely used as a forming material for packaging materials, protective films, optical products and the like.

When a hydrogenated crystalline dicyclopentadiene ring-opening polymer is used to produce a resin formed article excellent in the above properties, it is important to sufficiently progress the crystallization and increase the crystallinity in the forming step.

However, when injection forming is carried out at a low mold temperature, the crystallinity of the resin formed article tends to decrease, and thus a resin formed article having desired properties have not been obtained, or the resin formed article has been deformed during releasing in some cases.

As a method for solving these problems, Patent Document 1 describes a hydrogenated crystalline cycloolefin ring-opening polymer, and a resin composition containing 1 to 4 parts by weight of wax and nucleating agent based on 100 parts by weight of this hydrogenated polymer.

Patent Literature 1 describes that a resin formed article having a high crystallinity is obtained by using this resin composition even in the case of injection forming at a low mold temperature.

CITATION LIST

Patent Literature

Patent Literature 1: WO 2012/033076

SUMMARY OF INVENTION

Technical Problem

The above-described properties of the hydrogenated crystalline dicyclopentadiene ring-opening polymer are considered to be fully utilized also for resin formed articles used in the medical field and the semiconductor manufacturing field.

Conventionally, inorganic nucleators such as kaolin and talc have been suitably used for obtaining a low-polluting resin formed article.

However, when obtaining a resin formed article made of a crystalline resin, the nucleator should be blended in a large amount for sufficiently progressing the crystallization, and thus there are possibilities of decreased transparency and poor dispersibility. In addition, in relation to a resin formed article containing a relatively large amount of additives such as wax and nucleator, these components and decomposed products thereof may elute or volatilize from the resin formed article.

Thus, development of a resin composition which contains a hydrogenated crystalline dicyclopentadiene ring-opening polymer and allows for obtaining a lower-polluting resin formed article, has been required.

The present invention has been made in view of the above situation, and the object of the present invention is to provide a resin composition containing a hydrogenated crystalline dicyclopentadiene ring-opening polymer, which is suitably used as a raw material for a low-polluting resin formed article, and a low-polluting resin formed article containing the hydrogenated crystalline dicyclopentadiene ring-opening polymer.

Solution to Problem

In order to solve the above problems, the inventors of the present invention intensively studied about the resin composition containing a hydrogenated crystalline dicyclopentadiene ring-opening polymer.

As a result, in relation to the hydrogenated crystalline dicyclopentadiene ring-opening polymer, it has been found that even a polymer containing no wax sufficiently progresses the crystallization of the hydrogenated crystalline dicyclopentadiene ring-opening polymer by blending a small amount of nucleator into the resin composition, and a low-polluting resin formed article with a small amount of released organic substances can be obtained, and this finding has led to the completion of the invention.

Consequently, aspects of the invention provide resin compositions according to the following [1] and [2], and resin formed articles according to the following [3] to [5].

[1] A resin composition containing a hydrogenated crystalline dicyclopentadiene ring-opening polymer and a nucleator,
wherein a content of the nucleator is 0.01 to 0.50 part by weight based on 100 parts by weight of the hydrogenated crystalline dicyclopentadiene ring-opening polymer.

[2] The resin composition according to [1], wherein the nucleator is an organic metal phosphate salt.

[3] A resin formed article containing a hydrogenated crystalline dicyclopentadiene ring-opening polymer and a nucleator, wherein a content of the nucleator is 0.01 to 0.50 part by weight based on 100 parts by weight of the hydrogenated crystalline dicyclopentadiene ring-opening polymer.

[4] The resin formed article according to [3], wherein the nucleator is an organic metal phosphate salt.

[5] The resin formed article according to [3] or [4], wherein an amount of organic substances released when the resin formed article is heated at 100° C. for 30 minutes is 0.1 ppm or less.

Advantageous Effects of Invention

Aspects of the invention provide a resin composition containing a hydrogenated crystalline dicyclopentadiene ring-opening polymer, which is suitably used as a raw material for a low-polluting resin formed article, and a low-polluting resin formed article containing the hydrogenated crystalline dicyclopentadiene ring-opening polymer.

DESCRIPTION OF EMBODIMENTS

Hereinafter, the present invention will be explained in detail by classifying the aspects into 1) resin composition and 2) resin formed article. In the present specification, "may have a substituent" means "have no substituents or have a substituent".

1) Resin Composition

The resin composition according to the present invention is a resin composition containing a hydrogenated crystalline dicyclopentadiene ring-opening polymer and a nucleator, and is characterized in that the content of the nucleator is 0.01 to 0.50 part by weight based on 100 parts by weight of the hydrogenated crystalline dicyclopentadiene ring-opening polymer.

[Hydrogenated Crystalline Dicyclopentadiene Ring-Opening Polymer]

The hydrogenated crystalline dicyclopentadiene ring-opening polymer contained in the resin composition according to the present invention is a hydrogenation reaction product of a dicyclopentadiene ring-opening polymer and has crystallinity.

The "dicyclopentadiene ring-opening polymer" is a ring-opening polymer obtained by ring-opening polymerization of dicyclopentadiene, and includes a homopolymer of dicyclopentadiene and a copolymer having a repeating unit derived from dicyclopentadiene.

The "crystallinity" means a property that a melting point can be observed with a differential scanning calorimeter (DSC) by optimizing measurement conditions, which is a property determined depending on the tactic structure of the polymer chain.

Dicyclopentadiene used for producing the hydrogenated crystalline dicyclopentadiene ring-opening polymer (hereinafter referred to as "polymer (a)" in some cases) includes endo and exo stereoisomers. In the present invention, both of them can be used as monomers, and one of the isomers may be used alone, or alternatively an isomer mixture including the endo isomer and the exo isomer in an arbitrary ratio may be used. However, from the viewpoint of increasing the crystallinity of the polymer (a) and particularly improving the heat resistance, it is preferable to increase the ratio of one stereoisomer. For example, the ratio of the endo isomer or the exo isomer is preferably 80% or higher, more preferably 90% or higher, and particularly preferably 95% or higher. The stereoisomer at a higher ratio is preferably the endo isomer from the viewpoint of synthetic easiness.

The dicyclopentadiene ring-opening polymer has a repeating unit derived from dicyclopentadiene in its molecule.

A homopolymer having the repeating unit derived from dicyclopentadiene can be synthesized by ring-opening polymerization reaction using dicyclopentadiene.

In addition, a copolymer having the repeating unit derived from dicyclopentadiene can be synthesized by ring-opening copolymerization using dicyclopentadiene and a monomer capable of ring-opening copolymerization with dicyclopentadiene.

Examples of the monomer capable of ring-opening copolymerization with dicyclopentadiene (hereinafter referred to as "other monomer" in some cases) include the followings:

a bicyclic monomer such as bicyclo[2.2.1]hept-2-ene (trivial name: norbornene), 5-ethylidene-bicyclo[2.2.1]hept-2-ene (trivial name: ethylidene norbornene) and derivatives thereof (having a substitute on the ring); a tricyclic monomer such as tricyclo[5.2.1.0$^{2,6}$]deca-3,8-diene (trivial name: dicyclopentadiene) and derivatives thereof; and a tetracyclic monomer such as tetracyclo[9.2.1.0$^{2,10}$.0$^{3,8}$]tetradeca-3,5,7,12-tetraene (trivial name: methano-tetrahydrofluorene) and derivatives thereof, tetracyclo[6.2.1.1$^{3,6}$.0$^{2,7}$]dodec-4-ene (trivial name: tetracyclododecene) and 9-ethylidenetetracyclo[6.2.1.1$^{3,6}$.0$^{2,7}$]dodec-4-ene and derivatives thereof.

These monomers may have a substituent at any position. Examples of such a substituent include an alkyl group such as a methyl group and an ethyl group; an alkenyl group such as a vinyl group; an alkylidene group such as an ethylidene group and a propan-2-ylidene group; an aryl group such as a phenyl group; a hydroxy group; an alkoxy group such as a methoxy group; an acid anhydride group; a carboxyl group; an alkoxycarbonyl group such as a methoxycarbonyl group; and the like.

Examples of the monocyclic cycloolefin include a cyclic monoolefin such as cyclobutene, cyclopentene, methylcyclopentene, cyclohexene, methylcyclohexene, cycloheptene and cyclooctene; a cyclic diolefin such as cyclohexadiene, methylcyclohexadiene, cyclooctadiene, methylcyclooctadiene and phenylcyclooctadiene; and the like.

These other monomers may be used alone or in combination of two or more kinds.

A polymer (α) can be produced by subjecting the dicyclopentadiene ring-opening polymer obtained by ring-opening polymerization of dicyclopentadiene or a monomer mixture containing dicyclopentadiene and another monomer, to a hydrogenation reaction. The ring-opening polymerization reaction and hydrogenation reaction can be carried out in accordance with a known method.

The ratio of the repeating unit derived from dicyclopentadiene in the polymer (α) is not particularly limited, but is preferably 90 wt % or higher, more preferably 95 wt % or higher, particularly preferably 97 wt % or higher, and most preferably 100 wt % in the whole repeating unit.

When the polymer (α) containing a large amount of repeating units derived from dicyclopentadiene is used, a resin formed article more excellent in heat resistance and having high crystallinity can be easily obtained.

Examples of the polymer (α) include polymers having syndiotacticity described in JP-A-2006-052333, WO 2012/033076 brochure, and PCT/JP2016/58417, a polymer having isotacticity described in JP-A-2002-249553, and the like.

A melting point of the polymer (α) is 200° C. or higher, preferably 200 to 350° C., more preferably 200 to 320° C., and particularly preferably 220 to 300° C.

A forming material containing the polymer (α) whose melting point is within this range has good formability. In addition, a resin formed article excellent in heat resistance can be easily obtained by using this forming material.

The polymer (α) has a weight average molecular weight (Mw) of normally 1,000 to 1,000,000, and preferably 2,000 to 500,000.

In addition, the polymer (α) has a molecular weight distribution (Mw/Mn) of normally 1.0 to 4.0, and preferably 1.5 to 3.5.

When the weight average molecular weight and the molecular weight distribution of the polymer (α) are within the above ranges, a resin formed article having a sufficient mechanical strength can be easily obtained.

A number average molecular weight (Mn), the weight average molecular weight (Mw) and the molecular weight distribution (Mw/Mn) of the polymer (α) are nearly equal to those of the polymer before hydrogenation reaction.

The polymer (α) has a glass transition point (Tg) of preferably 80° C. or higher, and more preferably 85° C. or higher. The glass transition point within this range is suitable, because the heat resistance is good, and e.g. a deflection temperature under load is high. The upper limit of the glass transition point is not particularly limited, but is generally about 120° C.

As the polymer (α), a hydrogenated syndiotactic crystalline dicyclopentadiene ring-opening polymer (hereinafter referred to as "polymer (α')" in some cases) having a repeating unit of a hydrogenated poly(endo-cyclopentadiene) represented by the following formula (1):

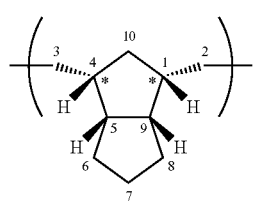

is preferred, because a resin formed article having the desired properties can be easily obtained.

In the polymer (α'), the carbon atoms represented by (1, 4) in the above formula (1) are asymmetric carbon atoms (indicated by *), and thus the polymer (α') has a tactic structure (tacticity).

The polymer (α') has syndiotacticity. In the polymer (α'), the syndiotacticity, i.e. a ratio of racemo diads in a sum of meso diads and racemo diads (hereinafter simply referred to as a ratio of racemo diads in some cases) in the steric configuration is preferably higher than 90%.

When the ratio of the racemo diads is higher than 90%, the crystallinity of the polymer (α') is improved.

Specifically, the syndiotacticity can be determined by equation I: [(racemo diads)/(meso diads+racemo diads)×100 (%)].

The ratio of the racemo diads can be calculated by analyzing a $^{13}$C-NMR spectrum of the polymer (α'). Specifically, the ratio can be determined by quantifying spectra of carbon atoms on (5, 9) in the above formula (1) of the polymer (α'). That is, in relation to the carbon atoms on (5, 9) in the repeating unit represented by the above formula (1), the $^{13}$C-NMR spectrum may be measured in a orthodichlorobenzene-$d_4$/1,2,4-trichlorobenzene (TCB)-$d_3$ [mixing ratio (by weight): 1/2] mixed solvent at 200° C., and a peak area value of the signal at 43.35 ppm attributed to the meso diads and a peak area value of the signal at 43.43 ppm attributed to the racemo diads may be substituted into the above equation I and calculated to determine the ratio of the racemo diads.

The catalyst used for producing the polymer (α) is not particularly limited as long as it allows ring-opening polymerization of dicyclopentadiene to produce the polymer (α).

Such a catalyst includes a ring-opening polymerization catalyst containing a metal compound (hereinafter referred to as "metal compound (2)" in some cases) represented by the following formula (2) as a catalytic active component.

In formula (2), M represents a metal atom selected from Group 6 transition metal compounds in the periodic table. $R^1$ represents a phenyl group which may have a substituent on at least one of positions 3, 4 and 5, or a group represented by —$CH_2R^3$, wherein $R^3$ represents a group selected from hydrogen atom, an alkyl group which may have a substituent, and an aryl group which may have a substituent. $R^2$ represents a group selected from an alkyl group which may have a substituent and an aryl group which may have a substituent. X represents a group selected from a halogen atom, an alkyl group, an aryl group and an alkylsilyl group. L represents an electron-donating neutral ligand. a represents 0 or 1, and b represents an integer of 0 to 2. When there are a plurality of Xs or a plurality of Ls, the Xs or Ls may be the same as or different from each other.

The metal atom (M) included in the metal compound (2) is selected from group 6 transition metal atoms (chromium, molybdenum, and tungsten) in the periodic table. Above all, molybdenum or tungsten is preferred, and tungsten is more preferred.

The metal compound (2) includes a metal imide bond.

$R^1$ represents a substituent on a nitrogen atom forming the metal imide bond.

Examples of the substituent of the phenyl group which may have a substituent on at least one of positions 3, 4 and 5 of $R^1$ include an alkyl group such as a methyl group and an ethyl group; a halogen atom such as a fluorine atom, a chlorine atom and a bromine atom; an alkoxy group such as a methoxy group, an ethoxy group and an isopropoxy group; and the like, and may further include mutually-bonded substituents on at least two of positions 3, 4 and 5.

Specific examples of the phenyl group which may have a substituent on at least one of positions 3, 4 and 5 include a phenyl group; a monosubstituted phenyl group such as a 4-methylphenyl group, a 4-chlorophenyl group, a 3-methoxyphenyl group, a 4-cyclohexylphenyl group and a 4-methoxyphenyl group; a disubstituted phenyl group such as a 3,5-dimethylphenyl group, a 3,5-dichlorophenyl group, a 3,4-dimethylphenyl group and a 3,5-dimethoxyphenyl group; a trisubstituted phenyl group such as a 3,4,5-trimethylphenyl group and a 3,4,5-trichlorophenyl group; and a 2-naphthyl group which may have a substituent, such as a 2-naphthyl group, a 3-methyl-2-naphthyl group and a 4-methyl-2-naphthyl group.

The number of carbon atoms in the alkyl group which may have a substituent, for $R^3$ in the group represented by —$CH_2R^3$ for $R^1$ is not particularly limited, but is normally 1 to 20, preferably 1 to 10, and more preferably 1 to 4. In addition, this alkyl group may be linear or branched. The substituent in this alkyl group is not particularly limited, but can be exemplified by a phenyl group which may have a substituent, such as a phenyl group and a 4-methylphenyl group; and an alkoxyl group such as a methoxy group and an ethoxy group.

Examples of the aryl group which may have a substituent, for $R^3$ include a phenyl group, a 1-naphthyl group, a 2-naphthyl group and the like. The substituent of the aryl group is not particularly limited, but can be exemplified by a phenyl group which may have a substituent, such as a phenyl group and a 4-methylphenyl group; an alkoxyl group such as a methoxy group and an ethoxy group; and the like.

Above all, the alkyl group having 1 to 20 carbon atoms such as a methyl group, an ethyl group, a propyl group, an isopropyl group, a butyl group, an isobutyl group, a t-butyl group, a pentyl group, a hexyl group, an octyl group and a decyl group is preferred as $R^3$.

X represents a group selected from a halogen atom, an alkyl group, an aryl group and an alkylsilyl group. When the metal compound (2) has two or more groups represented by X, these groups may bind to each other.

Examples of the halogen atom for X include a chlorine atom, a bromine atom and an iodine atom. Examples of the alkyl group for X include a methyl group, an ethyl group, a propyl group, an isopropyl group, a butyl group, an isobutyl group, a t-butyl group, a pentyl group, a neopentyl group, a benzyl group, a neophyl group and the like. Examples of the aryl group for X include a phenyl group, a 4-methylphenyl group, a 2,6-dimethylphenyl group, a 1-naphthyl group, a 2-naphthyl group, and the like. Examples of the alkylsilyl group for X include a trimethylsilyl group, a triethylsilyl group, a t-butyldimethylsilyl group, and the like.

$R^2$ represents a group selected from an alkyl group which may have a substituent and an aryl group which may have a substituent. Examples of the alkyl group which may have a substituent and the aryl group which may have a substituent for $R^2$ include the same groups as described for the alkyl group which may have a substituent and the aryl group which may have a substituent, for the $R^3$.

L represents an electron-donating neutral ligand. Examples thereof include electron-donating compounds containing group 15 or 16 atom in the periodic table.

Specific examples thereof include phosphines such as trimethylphosphine, triisopropylphosphine, tricyclohexylphosphine and triphenylphosphine; ethers such as diethyl ether, dibutyl ether, 1,2-dimethoxyethane and tetrahydrofuran; and an amines such as trimethylamine, triethylamine, pyridine and lutidine. Above all, the ethers are preferred.

As the metal compound (2), a tungsten compound having a phenylimide group (a compound of formula (2) in which M represents a tungsten atom and $R^1$ represents a phenyl group) is preferred, and tetrachlorotungsten phenylimide (tetrahydrofuran) is more preferred.

The metal compound (2) can be synthesized by mixing an oxyhalide of a Group 6 transition metal with phenyl isocyanates which may have a substituent on at least one of positions 3, 4 and 5, or mixing monosubstituted methylisocyanates with an electron-donating neutral ligand (L) and, if necessary, alcohols, a metal alkoxide and a metal aryloxide, or the like manner (e.g. a method described in JP-A-5-345817). The synthesized metal compound (2) may be purified and isolated by crystallization or the like and then used for ring-opening polymerization, or alternatively the obtained mixture may be directly used as a catalyst solution without purification.

For the ring-opening polymerization of the monomer such as dicyclopentadiene, the amount of the polymerization catalyst used relative to the monomer is not particularly limited, but a molar ratio of the tungsten compound: dicyclopentadiene and the like in the polymerization catalyst is within a range of preferably 1:10 to 1:2,000,000, more preferably 1:200 to 1:1,000,000, and particularly preferably 1:500 to 1:500,000. If the amount of the polymerization catalyst used is too large, the polymerization catalyst may be difficult to remove, and if it is too small, there is a possibility that sufficient polymerization activity is not obtained.

Although the polymerization reaction can be carried out in a solvent-free system, it is preferably to carry out the reaction in an organic solvent from the viewpoint of favorably controlling the reaction. The organic solvent used in this case is not particularly limited as long as the solvent allows dissolution or dispersion of the produced ring-opening polymer and does not adversely affect the polymerization reaction. Specific examples of the organic solvent that can be used include an aliphatic hydrocarbon such as pentane, hexane and heptane; an alicyclic hydrocarbon such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindenecyclohexane and cyclooctane; an aromatic hydrocarbon such as benzene, toluene and xylene; a halogen-based aliphatic hydrocarbon such as dichloromethane, chloroform and 1,2-dichloroethane; a halogen-based aromatic hydrocarbon such as chlorobenzene and dichlorobenzene; a nitrogen-containing hydrocarbon such as nitromethane, nitrobenzene and acetonitrile; an ether such as diethyl ether and tetrahydrofuran; an aromatic ether such as anisole and phenetole; and the like. Above all, the aromatic hydrocarbon, the aliphatic hydrocarbon, the alicyclic hydrocarbon, the ether and the aromatic ether are preferably used.

When the polymerization reaction is carried out in an organic solvent, a concentration of the monomer in the reaction solution at the start of the reaction is not particularly limited, but is preferably 1 to 50 wt %, more preferably 2 to 45 wt %, and particularly preferably 3 to 40 wt %. If the concentration of the monomer is too low, the productivity may be poor, and if it is too high, the viscosity of the reaction solution after the polymerization reaction may be too high, and thus the subsequent hydrogenation reaction may be difficult.

The polymerization temperature is not particularly limited, but is normally −30 to +200° C., and preferably 0 to 180° C. Also, the polymerization time is not particularly limited, but is normally selected from a range of 1 minute to 100 hours.

When ring-opening polymerization is carried out using the metal compound (2), the metal compound (2) may be used alone, or the metal compound (2) may be used in combination with an organometallic reducing agent. The polymerization activity may be enhanced by using the metal compound (2) in combination with the organometallic reducing agent.

Examples of the organometallic reducing agent include Group 1, 2, 12, 13 and 14 compounds in the periodic table, having a hydrocarbon group having 1 to 20 carbon atoms. Above all, an organolithium, an organomagnesium, an organozinc, an organoaluminum or an organotin is preferably used, and particularly the organoaluminum or the organotin is preferably used.

Examples of the organolithium include methyllithium, n-butyllithium, phenyllithium and the like. Examples of the organomagnesium include butylethylmagnesium, butyloctylmagnesium, dihexylmagnesium, ethylmagnesium chloride, n-butylmagnesium chloride, allylmagnesium bromide and the like. Examples of the organozinc include dimethyl zinc, diethyl zinc, diphenyl zinc and the like. Examples of the organoaluminum include trimethylaluminum, triethylaluminum, triisobutylaluminum, diethylaluminum chloride, ethylaluminum sesquichloride, ethylaluminum dichloride, diethylaluminum ethoxide, diisobutylaluminum isobutoxide, ethylaluminum diethoxide, isobutylaluminum diisobutoxide and the like. Examples of the organotin include tetramethyltin, tetra (n-butyl) tin, tetraphenyltin and the like.

The organometallic reducing agent is used in an amount of preferably 0.1 to 100 molar times, more preferably 0.2 to 50 molar times, and particularly preferably 0.5 to 20 molar times the metal compound (2). If the amount of the organometallic reducing agent used is too small, the polymerization activity may not be improved, and if the amount of the organometallic reducing agent used is too large, side reactions may be readily caused.

An activity modifier may be added to the polymerization reaction system. The activity modifier is used for the purpose of stabilizing the ring-opening polymerization catalyst, and adjusting a rate of the polymerization reaction and a molecular weight distribution of the polymer.

The activity modifier is not particularly limited as long as it is an organic compound having a functional group, but it is preferably an oxygen-containing organic compound, a nitrogen-containing organic compound, or a phosphorus-containing organic compound. Specific examples thereof include ethers such as diethyl ether, diisopropyl ether, dibutyl ether, anisole, furan and tetrahydrofuran; ketones such as acetone, benzophenone and cyclohexanone; esters such as ethyl acetate; nitriles such as acetonitrile benzonitrile; amines such as triethylamine, triisopropylamine, quinuclidine and N,N-diethylaniline; pyridines such as pyridine, 2,4-lutidine, 2,6-lutidine and 2-t-butylpyridine; phosphines such as triphenylphosphine and tricyclohexylphosphine; phosphates such as trimethyl phosphate and triphenyl phosphate; phosphine oxides such as triphenylphosphine oxide; and the like. Each of these activity modifiers may be used alone or in combination of two or more kinds.

When using the activity modifier, its amount is not particularly limited, but it may be normally selected from a range of 0.01 to 100 mol % based on the metal compound (2) used as the ring-opening polymerization catalyst.

For the polymerization reaction, a molecular weight modifier such as a vinyl compound or a diene compound may be added to the polymerization reaction system for the purpose of adjusting the molecular weight of the obtained dicyclopentadiene ring-opening polymer.

The vinyl compound to be used is not particularly limited as long as it is an organic compound having a vinyl group. For example, α-olefins such as 1-butene, 1-pentene, 1-hexene and 1-octene; styrenes such as styrene and vinyltoluene; ethers such as ethyl vinyl ether, i-butyl vinyl ether and allyl glycidyl ether; a halogen-containing vinyl compound such as allyl chloride; an oxygen-containing vinyl compound such as allyl acetate, allyl alcohol and glycidyl methacrylate; a nitrogen-containing vinyl compound such as acrylamide; a silicon-containing vinyl compound such as vinyltrimethylsilane, allyltrimethylsilane and vinyltrimethoxysilane; and the like can be used.

Also, the diene compound to be used is not particularly limited. For example, a non-conjugated diene such as 1,4-pentadiene, 1,4-hexadiene, 1,5-hexadiene, 1,6-heptadiene, 2-methyl-1,4-pentadiene and 2,5-dimethyl-1,5-hexadiene; a conjugated diene such as 1,3-butadiene, 2-methyl-1,3-butadiene, 2,3-dimethyl-1,3-butadiene, 1,3-pentadiene and 1,3-hexadiene; and the like can be used.

The amount of the added molecular weight modifier may be determined depending on the desired molecular weight, but is normally selected from a range of 0.1 to 10 mol based on 100 mol of dicyclopentadiene or the like used as the monomer.

The dicyclopentadiene ring-opening polymer produced by the polymerization reaction may be recovered from the reaction solution and subjected to the hydrogenation reaction, but the reaction solution containing the dicyclopentadiene ring-opening polymer may be directly subjected to the hydrogenation reaction.

The dicyclopentadiene ring-opening polymer can be hydrogenated by a process that, to a system containing the dicyclopentadiene ring-opening polymer, (a) a hydrogenating agent is added and then heated for reaction (hydrogen-transferring hydrogenation reaction), or (b) a hydrogenation catalyst is added and then hydrogen is added to hydrogenate a carbon-carbon-double bond in the dicyclopentadiene ring-opening polymer (catalytic hydrogenation reaction).

Above all, (b) hydrogenation using the hydrogenation catalyst and the hydrogen gas is preferred from the viewpoint of industrial production.

The hydrogenating agent used in the method (a) is not particularly limited as long as it can hydrogenate the carbon-carbon double bond in the dicyclopentadiene ring-opening polymer. Examples thereof include hydrazine, p-toluenesulfonyl hydrazide and the like.

Examples of the hydrogenation catalyst used in the method (b) include catalysts which have been conventionally known as hydrogenation catalysts for ring-opening polymers. Specific examples thereof include RuHCl(CO)(PPh$_3$)$_3$, RuHCl(CO)[P(p-Me-Ph)$_3$]$_3$, RuHCl(CO)(PCy$_3$)$_2$, RuHCl(CO)[P(n-Bu)$_3$]$_3$, RuHCl(CO)[P(i-Pr)$_3$]$_2$, RuH$_2$(CO)(PPh$_3$)$_3$, RuH$_2$(CO)[P(p-Me-Ph)$_3$]$_3$, RuH$_2$(CO)(PCy$_3$)$_3$, RuH$_2$(CO)[P(n-Bu)$_3$]$_3$RuH(OCOCH$_3$)(CO)(PPh$_3$)$_2$, RuH(OCOPh)(CO)(PPh$_3$)$_2$, RuH(OCOPh-CH$_3$)(CO)(PPh$_3$)$_2$, RuH(OCOPh-OCH$_3$)(CO)(PPh$_3$)$_2$, RuH(OCOPh)(CO)(PCy$_3$)$_2$, Raney nickel, nickel diatomaceous earth, nickel acetate, palladium acetate, PdCl$_2$, RhCl(PPh)$_3$, and the like.

The hydrogenation reaction is normally carried out in an inert organic solvent. Examples of the usable inert organic solvents include alicyclic hydrocarbons such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindenecyclohexane and cyclooctane; aromatic hydrocarbons such as benzene, toluene and xylene; halogen-based aliphatic hydrocarbons such as dichloromethane, chloroform and 1,2-dichloroethane; halogen-based aromatic hydrocarbons such as chlorobenzene and dichlorobenzene; ethers such as diethyl ether and tetrahydrofuran; an aromatic ether such as anisole and phenetole; and the like.

Although the reaction conditions for the hydrogenation reaction vary depending on the hydrogenating agent to be used and the hydrogenation catalyst system, the reaction temperature is normally −20 to +250° C., preferably −10 to +220° C., and more preferably 0 to 200° C. If the hydrogenation temperature is too low, the reaction rate may be too slow, and if it is too high, side reactions may be caused. In the case of the catalytic hydrogenation reaction, the hydrogen pressure is normally 0.01 to 20 MPa, preferably 0.05 to 15 MPa, and more preferably 0.1 to 10 MPa. If the hydrogen pressure is too low, the hydrogenation rate may be too slow, and if it is too high, restrictions regarding the apparatus are caused from the viewpoint that a high-pressure resistant reactor is required.

The reaction time is not particularly limited as long as a desired hydrogenation ratio can be achieved, but is normally 0.1 to 10 hours. After the hydrogenation reaction, the desired polymer (α') may be recovered in accordance with a conventional method.

In the hydrogenation reaction of the dicyclopentadiene ring-opening polymer, the hydrogenation ratio (ratio of the hydrogenated double bonds on the main chain) of the polymer (α') is not particularly limited, but is preferably 98% or higher, and more preferably 99% or higher. The higher the hydrogenation ratio is, the better the heat resistance of the polymer (α') is.

[Nucleator]

The nucleator contained in the resin composition and resin formed article according to the present invention is a substance for promoting crystallization of the polymer (α) in the forming step.

As the nucleator, both an inorganic nucleator and an organic nucleator can be used, but the organic nucleator is preferred because a better effect of the present invention can be easily obtained.

Examples of the inorganic nucleator include talc, kaolin, silica, carbon black, titanium oxide, zinc oxide, magnesium oxide, aluminum oxide, neodymium oxide, calcium sulfate, barium sulfate and the like.

Examples of the organic nucleator include a sorbitol-based compound such as dibenzylidine sorbitol and diparamethyldibenzylidene sorbitol; a hindered amine-based compound such as bis(1,2,2,6,6-pentamethyl-4-piperidyl)[[3,5-bis(1,1-dimethylethyl)-4-hydroxyphenyl]methyl] butyl malonate; a hindered phenol-based compound such as triethyleneglycol-bis[3-(3-t-butyl-5-methyl-4-hydroxyphenyl) propionate], 1,3,5-tris[(4-t-butyl-3-hydroxy-2,6-xylyl) methyl]-1,3,5-triazine-2,4,6 (1H,3H,5H)-trione and 1,3,5-trimethyl-2,4,6-tris(3',5'-di-t-butyl-4-hydroxybenzyl) benzene; kaolin; talc; an organic metal carboxylate salt such as sodium benzoate, calcium oxalate, magnesium stearate and potassium benzoate; an organic metal phosphate salt; and the like.

Above all, the organic metal phosphate salt is more preferred, because a resin formed article excellent in transparency can be easily obtained.

The organic metal phosphate salt is not particularly limited, and a conventionally-known organic metal phosphate can be used. Specifically, it can be exemplified by a compound represented by the following formula (3) or (4).

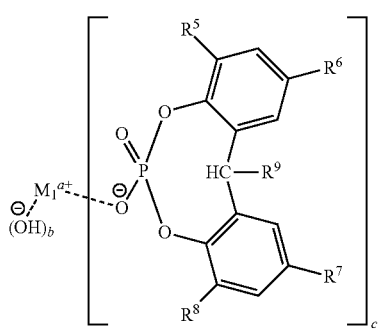
(3)

In the formula (3), each of $R^5$ to $R^8$ independently represents a hydrogen atom or an alkyl group having 1 to 12 carbon atoms, and $R^9$ represents a hydrogen atom or an alkyl group having 1 to 4 carbon atoms. $M_1$ represents a group 1 atom or a group 2 atom in the periodic table, a zinc atom, or an aluminum atom. a represents an integer of 1 to 3, c represents an integer of 1 or larger, and b represents an integer of 0 or larger that satisfies a=b+c.

In the compound represented by formula (3), each of $R^5$ to $R^8$ represents preferably an alkyl group having 1 to 5 carbon atoms, and more preferably a methyl group, an ethyl group and a tert-butyl group.

Preferably $R^9$ represents a hydrogen atom or a methyl group.

Examples of $M_1$ include lithium, sodium, calcium, zinc and aluminum, and lithium and sodium are preferred.

The compound represented by formula (3) can be exemplified by compounds represented by the following formulas (3a) to (3h). In the following formulas, t-Bu represents a tert-butyl group, and Me represents a methyl group (The same applies to the following.).

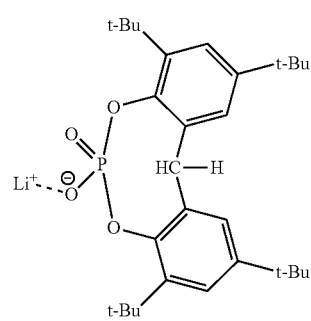
(3a)

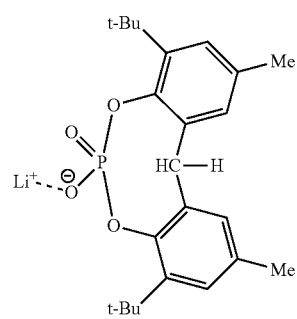
(3b)

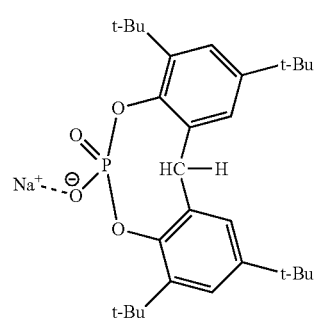
(3c)

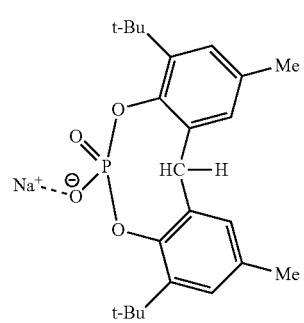
(3d)

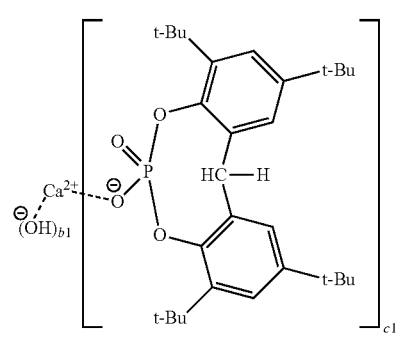
(3e)

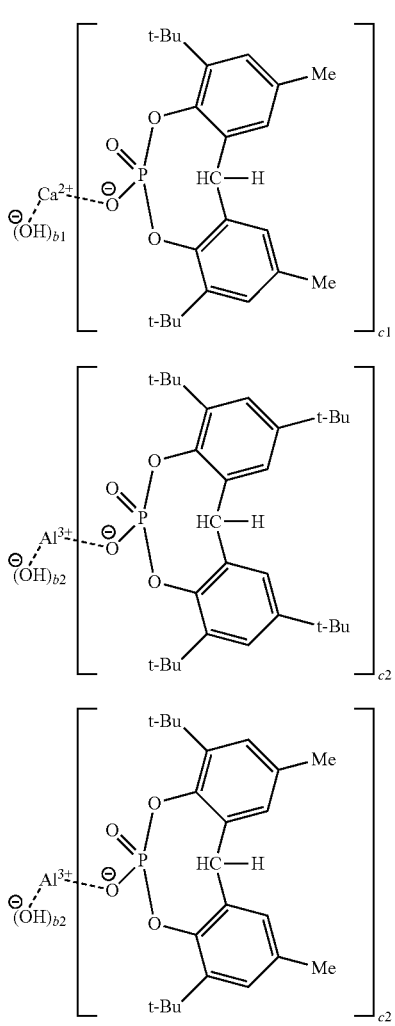

In formulas (3e) and (3f), b1 represents 0 or 1, in which b1+c1=2 is satisfied. In formulas (3g) and (3h), b2 represents 0, 1 or 2, wherein b2+c2=3 is satisfied.

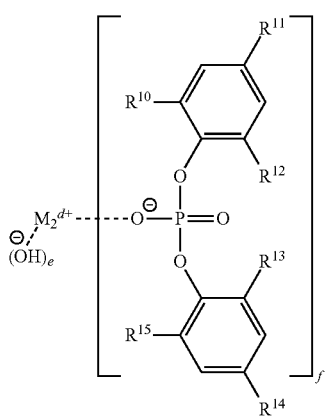

In formula (4), each of $R^{10}$ to $R^{15}$ independently represents a hydrogen atom or an alkyl group having 1 to 12 carbon atoms. $M_2$ represents a group 1 atom or a group 2 atom in the periodic table, a zinc atom, or an aluminum atom. d represents an integer of 1 to 3, f represents an integer of 1 or larger, and e represents an integer of 0 or larger that satisfies d=e+f.

In the compound represented by formula (4), each of $R^{10}$ to $R^{15}$ represents preferably a hydrogen atom, and an alkyl group having 1 to 5 carbon atoms, and more preferably a hydrogen atom, a methyl group, an ethyl group and a tert-butyl group.

Examples of $M_2$ include lithium, sodium, calcium, zinc and aluminum, and lithium and sodium are preferred.

The compound represented by formula (4) can be exemplified by a compound represented by the following formula (4a).

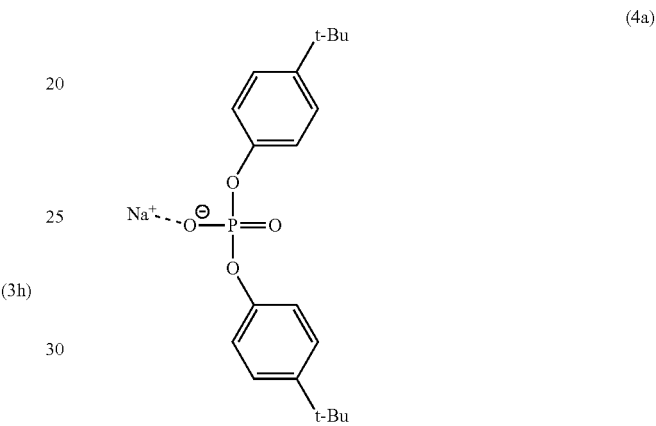

Above all, the compound represented by formula (3) is preferred, and the compounds represented by the formula (3c) and (3g) are more preferred.

The content of the nucleator is 0.01 to 0.50 part by weight, preferably 0.02 to 0.40 part by weight, and more preferably 0.05 to 0.20 part by weight based on 100 parts by weight of the hydrogenated crystalline dicyclopentadiene ring-opening polymer.

If the content of the nucleator is too small, a resin formed article having a high crystallinity cannot be obtained unless a mold temperature is increased and the molten resin is solidified for a long period. When such forming conditions are used, a low-polluting resin formed article is hardly obtained because thermal decomposition reaction of the additives and resin components readily occur.

On the other hand, if the content of the nucleator is too large, the transparency of the obtained resin formed article tends to decrease. Also in this case, a low-polluting resin formed article is hardly obtained because the nucleator and the decomposed product thereof are liable to elute or volatilize from the resin formed article.

The resin composition according to the present invention may contain other additives as long as the effect of the present invention is not impeded. Examples of other additives include an antioxidant, an ultraviolet absorber, a light stabilizer, a near-infrared absorber, a plasticizer, an antistatic agent, an acid scavenger, a flame retardant, a flame retardant promoter, and the like.

Examples of the antioxidant include a phenol-based antioxidant, a phosphorus-based antioxidant, a sulfur-based antioxidant, and the like.

Examples of the phenol-based antioxidant include 3,5-di-t-butyl-4-hydroxytoluene, 2,2'-methylenebis(6-t-butyl-4- methylphenol), 4,4'-butylidenebis(6-t-butyl-3-methylphenol), 4,4'-thiobis(6-t-butyl-3-methylphenol), α-tocopherol, 2,2,4-trimethyl-6-hydroxy-7-t-butylchroman, tetrakis[methylene-3-(3',5'-di-t-butyl-4'-hydroxyphenyl) propionate] methane, [pentaerythritol tetrakis[3-(3,5-di-t-butyl-4-hydroxyphenyl) propionate]], and the like.

Examples of the phosphorus-based antioxidant include distearylpentaerythritol diphosphite, bis(2,4-di-t-butylphenyl)pentaerythritol diphosphite, tris(2,4-di-t-butylphenyl) phosphite, tetrakis(2,4-di-t-butylphenyl)-4,4'-biphenyl diphosphite, trinonylphenyl phosphite, and the like.

Examples of the ultraviolet absorber include a benzotriazole-based ultraviolet absorber, a benzoate-based ultraviolet absorber, a benzophenone-based ultraviolet absorber, an acrylate-based ultraviolet absorber, a metal complex-based ultraviolet absorbers, and the like.

Examples of the light stabilizer include a hindered amine-based light stabilizer.

Examples of the near-infrared absorber include a cyanine-based near-infrared absorber; a pyrylium-based infrared absorber; a squarylium-based near-infrared absorber; a croconium-based infrared absorber; an azulenium-based near-infrared absorber; a phthalocyanine-based near-infrared absorber; a dithiol metal complex-based near-infrared absorber; a naphthoquinone-based near-infrared absorber; an anthraquinone-based near-infrared absorber; an indophenol-based near-infrared absorber; an azi-based near-infrared absorber; and the like.

Examples of the plasticizer include a phosphotriester-based plasticizer, an aliphatic monobasic acid ester-based plasticizer, a dihydric alcohol ester-based plasticizer, an oxyacid ester-based plasticizer, and the like.

Examples of the antistatic agent include a fatty acid ester of a polyhydric alcohol, and the like.

Examples of the acid scavenger include magnesium oxide, zinc stearate, and the like.

Examples of the flame retardant include an organophosphorus-based compound such as halogenated organic compound, red phosphorus, condensed phosphate ester, reactive phosphate ester, ammonium polyphosphate-based compound and metal phosphate-based compound; a melamine-based compound such as melamine phosphate and melamine cyanurate; and the like.

Examples of the flame retardant promoter include an inorganic hydroxide such as aluminum hydroxide and magnesium hydroxide; an inorganic oxide such as aluminum oxide hydrate and antimony oxide; a borate such as sodium borate; and the like.

These flame retardants and flame retardant promoters may be used alone or in combination of two or more kinds.

The (total) content of these other additives can be appropriately determined depending on the purpose. The content thereof ranges normally 0.001 to 5 parts by weight, and preferably 0.01 to 1 part by weight based on 100 parts by weight of the polymer (α).

The resin composition according to the present invention can be produced in accordance with a conventional method.

For example, the resin composition according to the present invention can be obtained by mixing the polymer (α), an additive and other additives used as necessary. The mixing method can be exemplified by a method of kneading each component in a molten state.

Kneading can be carried out using a melt kneader such as a single-screw extruder, a twin-screw extruder, a Banbury mixer, a kneader and a feeder ruder. A temperature for kneading ranges preferably 250 to 400° C., and more preferably 260 to 350° C. For kneading, each component may be collectively added and kneaded, or may be kneaded while adding them in several portions.

After kneading, the kneaded product can be extruded in a bar shape and cut into an appropriate length by a strand cutter so as to be pelletized in accordance with a conventional method.

The polymer (α) is liable to be poor in solubility in general organic solvents. Thus, this forming material is unsuitable as a forming material for the forming method using a solution such as a casting method.

On the other hand, the polymer (α) has such a property that it crystallizes in a short period when cooled in a molten state. Thereby, the desired resin formed article can be produced with high productivity by forming the forming material containing the resin composition according to the present invention using the melt forming method.

2) Resin Formed Article

The resin formed article according to the present invention is a resin formed article containing a hydrogenated crystalline dicyclopentadiene ring-opening polymer and a nucleator, wherein the content of the nucleator is 0.01 to 0.50 part by weight based on 100 parts by weight of the hydrogenated crystalline dicyclopentadiene ring-opening polymer, and the amount of the organic substances released when the resin formed article is heated at 100° C. for 30 minutes is 0.1 ppm or less.

The resin formed article according to the present invention can be produced by melt-forming the resin composition according to the present invention.

Examples of the melt forming method include an extrusion forming method, an injection forming method, a melt spin forming method, a press forming method, a blow forming method, a calender forming method and the like, and they can be appropriately selected depending on the desired resin formed article. Above all, the injection forming method is preferred because a resin formed article having the above properties can be easily obtained.

As the melt forming method, the injection forming method can be used to produce various injection-formed articles.

When an injection-formed article is produced by the injection forming method, a known method can be appropriately used. For example, the forming material is charged into an extruder, melt-kneaded, and then the molten resin is injected into a mold connected to the extruder, and the molten resin in the mold is cooled for solidification to obtain an injection-formed article.

The melt temperature during forming is normally 200 to 400° C., and preferably 210 to 350° C. When a glass transition temperature of the resin composition is defined as Tg, a mold temperature in a case of using the mold is normally 20° C. to (Tg+100°) C., preferably (Tg−40°) C. to (Tg+90°) C., and more preferably (Tg−30°) C. to (Tg+80°) C.

In the resin formed article according to the present invention, crystallization has sufficiently been progressed. A melting enthalpy of the resin formed article according to the present invention is preferably 10 to 60 J/g, and more preferably 20 to 50 J/g.

The melting enthalpy of the resin formed article can be measured in accordance with the method described in Examples.

When the resin formed article according to the present invention is heated at 100° C. for 30 minutes, an amount of the released organic substance is 0.1 ppm (μg [organic substance]/g [test piece]) or less, and preferably 0.08 ppm or less. Although there is no particular lower limit, it is normally 0.0001 ppm or more. The amount of the released organic substance (amount of outgas) can be measured by dynamic headspace-gas chromatography/mass spectrometry method (DHS-GC/MS method) described in Examples.

The resin formed article according to the present invention may be extracted with water at an extraction temperature of 100° C. for 2 hours on the bases of the eluate test method in "Test Methods for Plastic Containers" described in the 16th Edition of the Japanese Pharmacopoeia. For the obtained extract, the maximum absorbances at 220 to 240 nm and 241 to 350 nm are measured by ultraviolet-visible absorption spectrophotometry, and at this time, the maximum absorbance at 220 to 240 nm is preferably 0.05 or lower, and more preferably 0.01 or lower, and the maximum absorbance at 241 to 350 nm is preferably 0.05 or lower, and more preferably 0.01 or lower. Although these absorbances do not have particular lower limit values, they are normally 0.001 or higher.

As described above, in the resin formed article according to the present invention, the low-molecular-weight compound hardly elutes or volatilizes from the resin formed article.

A resin formed article having such a property can be efficiently produced e.g. by using the resin composition according to the present invention as a forming material and solidifying the melt under an appropriate condition.

That is, the resin composition according to the present invention contains an appropriate amount of nucleator, and thus when solidifying the melt in the mold, crystallization can be progressed in a short period without excessively increasing the mold temperature. As a result, elution and volatilization of the added nucleator and the decomposed product produced by heating can also be suppressed.

Examples of the resin formed article according to the present invention include various containers, pipes, joints, packings, insulators, tubes and the like.

Since the resin formed article according to the present invention is excellent in low-pollution property, it is particularly used as a resin formed article used in medical field [e.g. bottle, infusion bag, syringe, PTP (press through pack) packaging sheet, etc.), or a resin formed article used in semiconductor-manufacturing field (e.g. wafer carrier, cassette, box, shipping container, handle, etc.).

EXAMPLES

Next, the present invention will be described in more detail with reference to Examples, but the present invention is not limited to these examples at all.

Measurement and evaluation in each example were carried out in accordance with the following method.
(1) Molecular Weight (Weight Average Molecular Weight and Number Average Molecular Weight) of the Dicyclopentadiene Ring-Opening Polymer A molecular weight of the dicyclopentadiene ring-opening polymer was measured by H type column (manufactured by Tosoh Corporation) in a gel permeation chromatography (GPC) system HLC-8320 (manufactured by Tosoh Corporation) using tetrahydrofuran as a solvent at 40° C., and determined as a polystyrene-equivalent value.
(2) Hydrogenation Ratio of the Hydrogenated Syndiotactic Crystalline Dicyclopentadiene Ring-Opening Polymer Based on $^1$H-NMR measurement, a hydrogenation ratio of the hydrogenated syndiotactic crystalline dicyclopentadiene ring-opening polymer was determined.

(3) Melting Point of the Hydrogenated Syndiotactic Crystalline Dicyclopentadiene Ring-Opening Polymer Measurement using a differential scanning calorimeter was carried out while raising the temperature at a rate of 10° C./min, and a temperature at which a endothermic (crystal melting) enthalpy was highest at an endothermic peak observed during measurement with temperature rising, was defined as a melting point.
(4) Ratio of Racemo Diads in the Hydrogenated Syndiotactic Crystalline Dicyclopentadiene Ring-Opening Polymer $^{13}$C-NMR measurement was carried out using orthodichlorobenzene-$d_4$/1,2,4-trichlorobenzene (TCB)-$d_3$ (mixing ratio (by weight) 1/2) as a solvent at 200° C., and a ratio of racemo diads in the hydrogenated syndiotactic crystalline dicyclopentadiene ring-opening polymer was determined on the basis of a peak area value of the signal at 43.35 ppm attributed to the meso diad and a peak area value of the signal at 43.43 ppm attributed to the racemo diad.
(5) Melting Enthalpy of the Resin Formed Article A melting enthalpy $\Delta Hm$ (J/g) of the test piece obtained in each of Examples or Comparative Examples was determined from a thermogram obtained while rising the temperature at a heating rate of 10° C./min, using a differential scanning calorimeter in accordance with JIS K7122.
(6) Quantitation of the Amount of Outgas of the Resin Formed Article The amount of outgas of the resin formed article was measured on the basis of the DHS-GC/MS method. A glass tube sample vessel with an inner diameter of 4 mm containing 30 mg of the test piece obtained in each of Examples or Comparative Examples was connected to a gas collecting tube cooled with liquid nitrogen, then the sample vessel was heated in helium gas stream of high-purity (purity of helium: 99.99995 vol % or higher) at 100° C. for 30 minutes, and the gas released from the sample was continuously collected in a gas collecting tube. The collected gas was subjected to a thermal desorption-type gas chromatography mass spectrometry using n-decane as an internal standard, and the amount of the gas released from the sample was calculated as an n-decane equivalent value. The unit was ppm (μg [organic substance]/g [test piece]).
(7) Elution Test of the Resin Formed Article The test piece obtained in each of Examples or Comparative Examples was extracted with water at an extraction temperature of 100° C. for 2 hours on the bases of the eluate test method in "The Test Method for a Plastic Medicine Container" described in the 16th Edition of the Japanese Pharmacopoeia. For the obtained extract, the maximum absorbances at 220 to 240 nm and 241 to 350 nm were measured by ultraviolet-visible absorption spectrophotometry.

Synthesis Example 1

154.5 parts of cyclohexane, 42.8 parts (30 parts as dicyclopentadiene content) of cyclohexane solution of dicyclopentadiene (concentration: 70%) (endo isomer content: 99% or higher), and 1.9 parts of 1-hexene were added to a metal pressure-resistant reactor whose inside had been replaced by nitrogen, and heated to 53° C. while stirring the whole content.

On the other hand, 0.061 part of diethylaluminum ethoxide/n-hexane solution (concentration: 19%) was added to a solution prepared by dissolving 0.014 part of tetrachlorotungsten phenylimide (tetrahydrofuran) complex in 0.70 part of toluene, and stirred for 10 minutes to prepare a catalyst solution.

While stirring the contents in the reactor, this catalyst solution was added into the reactor to start the ring-opening polymerization reaction, and then the ring-opening polymerization reaction was continued while maintaining the whole content at 53° C. for 4 hours. Subsequently, 0.037 part of 1,2-ethanediol as a terminator was added to the reactor, the whole content was heated to 60° C. and stirred for 1 hour to terminate the polymerization reaction.

The resulting dicyclopentadiene ring-opening polymer in the reaction solution had a number average molecular weight (Mn) of 8,750, a weight average molecular weight (Mw) of 28,100, and a molecular weight distribution (Mw/Mn) of 3.21.

To the reaction solution, 1 part of hydrotalcite-like compound (KYOWAAD (registered trademark) 2000, manufactured by Kyowa Chemical Industry Co., Ltd.) as an adsorbent was added, heated to 60° C., and stirred for 1 hour. To this solution, 0.4 part of filter aid (Radiolite (registered trademark) #1500, manufactured by SHOWA CHEMICAL INDUSTRY CO., LTD.) was added, and then the adsorbent was filtered off by using a PP pleat cartridge filter (TCP-HX, manufactured by Advantec Toyo Kaisha, Ltd.).

To 200 parts of dicyclopentadiene ring-opening polymer solution after filtration (polymer content: 30 parts), 100 parts of cyclohexane and 0.0043 part of chlorohydridocarbonyltris(triphenylphosphine) ruthenium were added, and hydrogenated at a hydrogen pressure of 6 MPa and 180° C. for 4 hours. The resulting hydrogenation solution became a slurry liquid with precipitation of polymers.

This slurry liquid was centrifuged so as to be separated into the hydrogenated dicyclopentadiene ring-opening polymer and the solution, and the hydrogenated dicyclopentadiene ring-opening polymer was taken by filtration. Subsequently, this polymer was dried under reduced pressure at 60° C. for 24 hours to obtain 28.5 parts of hydrogenated crystalline dicyclopentadiene ring-opening polymer.

The hydrogenated dicyclopentadiene ring-opening polymer had a hydrogenation ratio of 99% or higher, a melting point (Tm) of 262° C., and a ratio of racemo diads of 89%.

Example 1

0.1 part of 2,2'-methylenebis(4,6-di-t-butylphenyl) sodium phosphate (ADK STAB (registered trademark) NA-11, manufactured by ADEKA CORPORATION) as a nucleator and 1.1 part of tetrakis[methylene-3-(3',5'-di-t-butyl-4'-hydroxyphenyl) propionate] methane (Irganox (registered trademark) 1010, manufactured by BASF Japan) as an antioxidant were mixed in 100 parts of the hydrogenated dicyclopentadiene ring-opening polymer obtained in Synthesis Example 1 to obtain a raw material composition. This raw material composition was charged into a twin-screw extruder (TEM-37B, manufactured by TOSHIBA MACHINE CO., LTD.) having four die holes with an inner diameter of 3 mm, formed into a strand-shaped formed article by a thermal melt extrusion method, cooled, and then shredded by a strand cutter to obtain a resin pellet (resin composition).

Operating conditions for the twin screw extruder are shown below.

Preset temperature of barrel: 270 to 280° C.
Preset temperature of die: 270° C.
Rotation speed of screw: 145 rpm
Rotation speed of feeder: 50 rpm The obtained resin pellet was injection-formed by an injection forming machine (ROBOSHOT S2000i-50A, manufactured by FANUC CORPORATION) under a condition of a forming temperature of 290° C., an injection pressure of 0.8 MPa, a mold temperature of 160° C. and a cooling time of 20 seconds, to obtain an injection-formed article having a length of 80 mm, a width of 50 mm and a thickness of 1 mm. This formed article was cut out into 1.5 mm×20 mm, outgas of the resin formed article was quantitatively determined, and an elution test was carried out for the resin formed article. The results are shown in Table 1.

Examples 2 to 5, and Comparative Examples 1 to 5

Resin composition and resin formed articles were obtained in the same manner as in Example 1 except that the blending and forming conditions described in Table 1 were used.

The results are shown in Table 1. In Table 1, the followings were used as nucleator (A), nucleator (B), nucleator (C) and wax.

Nucleator (A): ADK STAB (registered trademark) NA-11 (manufactured by ADEKA CORPORATION)
Nucleator (B): ADK STAB (registered trademark) NA-21 (manufactured by ADEKA CORPORATION)
Nucleator (C): Talc (trade name: MS-P, manufactured by Nippon Talc Co., Ltd.) Wax: trade name: LUVAX 1266 (manufactured by NIPPON SEIRO CO., LTD., melting point: 69° C.)

TABLE 1

| | | Examples | | | | |
|---|---|---|---|---|---|---|
| | | 1 | 2 | 3 | 4 | 5 |
| Resin compositions (part by weight) | Hydrogenated dicyclopentadiene ring-opening polymer (A) | 100 | 100 | 100 | 100 | 100 |
| | Nucleator (A) | 0.1 | 0.4 | 0.02 | — | — |
| | Nucleator (B) | — | — | — | 0.2 | — |
| | Nucleator (C) | — | — | — | — | 0.5 |
| | Wax | — | — | — | — | — |
| Quantification of outgas in resin formed article Total amount of outgas (μg/g) | | 0.0405 | 0.0623 | 0.0358 | 0.0551 | 0.0713 |
| Solidification conditions for molten resin | Mold temperature (° C.) | 160 | 160 | 160 | 160 | 160 |
| | Cooling time (s) | 20 | 20 | 20 | 10 | 20 |
| Melting enthalpy of resin formed article (J/g) | | 44.2 | 45.3 | 43.4 | 42.9 | 43.2 |
| Elution test of resin formed article | Maximum absorbance at 220 to 240 nm | <0.01 | <0.01 | <0.01 | <0.01 | <0.01 |
| | Maximum absorbance at 241 to 350 nm | <0.01 | <0.01 | <0.01 | <0.01 | <0.01 |

TABLE 1-continued

|  |  | Comparative Examples | | | | |
| --- | --- | --- | --- | --- | --- | --- |
|  |  | 1 | 2 | 3 | 4 | 5 |
| Resin compositions (part by weight) | Hydrogenated dicyclopentadiene ring-opening polymer (A) | 100 | 100 | 100 | 100 | 100 |
|  | Nucleator (A) | 0.8 | 0.8 | — | 0.001 | — |
|  | Nucleator (B) | — | — | — | — | — |
|  | Nucleator (C) | — | — | — | — | — |
|  | Wax | — | 2 | — | — | — |
| Quantification of outgas in resin formed article Total amount of outgas (μg/g) |  | 0.1245 | >1 | 0.1481 | 0.1253 | 0.3918 |
| Solidification conditions for molten resin | Mold temperature (° C.) | 160 | 160 | 160 | 160 | 200 |
|  | Cooling time (s) | 20 | 10 | 150 | 90 | 20 |
| Melting enthalpy of resin formed article (J/g) |  | 45.2 | 45.5 | 43.2 | 43.5 | 44.9 |
| Elution test of resin formed article | Maximum absorbance at 220 to 240 nm | 0.07 | 0.24 | 0.13 | 0.16 | 0.31 |
|  | Maximum absorbance at 241 to 350 nm | 0.09 | 0.25 | 0.11 | 0.10 | 0.26 |

The followings can be seen from Table 1.

In the resin formed articles of Examples 1 to 5, crystallization is sufficiently progressed, and both amounts of outgas and the elute are small.

On the other hand, since the content of the nucleator in the resin composition used in Comparative Example 1 is too large, the obtained resin formed article provides outgas in a large amount.

In Comparative Example 2, since the wax-containing resin composition was used, the cooling time was short and crystallization could be more efficiently progressed. However, the obtained resin formed article provides both outgas and eluate in large amounts.

In Comparative Example 3, a resin composition containing no nucleator was used, and in Comparative Example 4, a resin composition containing a small amount of nucleator was used, but the resin formed articles obtained in these examples provide both outgas and eluate in large amounts. In Comparative Examples 3 and 4, crystallization takes too long time, and thus it is considered that low-molecular-weight compounds produced by decomposition during crystallization have been released.

In Comparative Example 5, the melt was solidified in a mold while setting the mold temperature to a high temperature (200° C.), but the obtained resin formed article provides both outgas and eluate in large amounts.

The invention claimed is:

1. A resin composition comprising a hydrogenated crystalline dicyclopentadiene ring-opening polymer and a nucleator,
    wherein the hydrogenated crystalline dicyclopentadiene ring-opening polymer has a melting point of 200° C. or higher,
    the nucleator is an organic metal phosphate salt, and
    a content of the nucleator is 0.01 to 0.50 part by weight based on 100 parts by weight of the hydrogenated crystalline dicyclopentadiene ring-opening polymer.

2. A resin formed article comprising a hydrogenated crystalline dicyclopentadiene ring-opening polymer and a nucleator,
    wherein the hydrogenated crystalline dicyclopentadiene ring-opening polymer has a melting point of 200° C. or higher,
    the nucleator is an organic metal phosphate salt, and
    a content of the nucleator is 0.01 to 0.50 part by weight based on 100 parts by weight of the hydrogenated crystalline dicyclopentadiene ring-opening polymer.

3. The resin formed article according to claim 2, wherein an amount of organic substances released when the resin formed article is heated at 100° C. for 30 minutes is 0.1 ppm or less.

* * * * *